United States Patent [19]
Arnaud

[11] 3,714,329
[45] Jan. 30, 1973

[54] PROCESS FOR PREPARING STRONTIUM CARBONATE

[75] Inventor: Jose L. Arnaud, Modesto, Calif.

[73] Assignee: FMC Corporation, New York, N.Y.

[22] Filed: July 2, 1970

[21] Appl. No.: 52,099

[52] U.S. Cl. .................423/431, 23/300, 23/301, 23/304
[51] Int. Cl. .............................................C01f 11/18
[58] Field of Search..................23/66, 301, 304, 300

[56] References Cited

UNITED STATES PATENTS

| | | | |
|---|---|---|---|
| 301,382 | 7/1884 | Mebus et al. | 23/66 |
| 1,994,271 | 3/1935 | Church et al. | 23/66 |
| 2,295,291 | 9/1942 | Roderick | 23/66 |
| 2,853,363 | 9/1958 | Sidun et al. | 23/301 X |

Primary Examiner—Oscar R. Vertiz
Assistant Examiner—Gregory A. Heller
Attorney—Frank Ianno, Pauline Newman and Eugene G. Seems

[57] ABSTRACT

Strontium carbonate is prepared having a desired crystal size by continuously and simultaneously adding an aqueous solution of strontium sulfide and sodium carbonate to a reaction mass containing preformed crystals of strontium carbonate, with sufficient agitation so that the ratio of these reactants is maintained constant throughout the reaction mass.

4 Claims, No Drawings

PROCESS FOR PREPARING STRONTIUM CARBONATE

BACKGROUND OF THE INVENTION

A. Field of the Invention

This invention relates to a process for manufacturing strontium carbonate under conditions whereby its crystal size is controlled during the reaction of strontium sulfide and sodium carbonate.

B. Description of the Prior Art

The preparation of alkaline-earth metal carbonates by reaction of their precurser alkaline-earth metal sulfides with sodium carbonates is known. In general, most of the prior work done in this area has been conducted with barium salts in the preparation of barium carbonate. For example, a process such as that set forth in U.S. Pat. No. 3,421,843 issued on Jan. 14, 1969 to Conaway et al. described the preparation of barium carbonate crystals of a given size by reaction of carbon dioxide with a barium sulfide solution.

I have attempted to produce strontium carbonate by reaction of strontium sulfide and soda ash using conventional techniques established in the production of barium carbonate. This procedure entails preparing an aqueous solution of strontium sulfide at elevated temperatures and adding sodium carbonate to the heated solution. The strontium carbonate which precipitates in the solution has an extremely fine crystal structure, no larger than about 0.1 micron (the crystals range from about 0.05 to about 0.1 micron), and is most difficult to separate from its mother liquor. The filtration requires commercially impractical amounts of time and the cake retains substantial amounts of the mother liquor. This is undesirable because the mother liquor contains dissolved sodium sulfide therein which remains as an impurity with the precipitated strontium carbonate product after subsequent drying thereof. Also the large amount of mother liquor remaining in the product puts a heavy load on drying equipment which subsequently is used to dry the product.

As a result, there is a need to find a process which will overcome such serious obstacles to the commercial production of strontium carbonate and which will provide a method of obtaining strontium carbonate which is easily filtered and which does not have a high residue of mother liquor containing sodium sulfide.

STATEMENT OF THE INVENTION

I have now found that strontium carbonate of a desired crystal size up to 7 microns can be produced by continuously and simultaneously adding an aqueous strontium sulfide solution and sodium carbonate to a reaction mass containing preformed strontium carbonate under sufficient agitation so as to maintain at all times the proportion of the feed reactants in the reaction mass in the same proportions as they are fed to the reaction mass; the largest crystals are obtained when the feed reactants are in stoichiometric proportions and progressively smaller crystals are obtained as the ratio of the feed reactants moves away from stoichiometric proportions.

DESCRIPTION OF THE INVENTION AND THE PREFERRED EMBODIMENTS

In carrying out the present invention an aqueous solution of strontium sulfide is prepared as one of the reactants, normally from strontium values recovered from a strontium ore. In one method, a strontium ore, which normally contains strontium in the form of strontium sulfate, is suitably ground and reacted with coke in a furnace at temperatures on the order of 1,200°C. The product of this reaction is "black ash" which is an impure strontium sulfide product mixture. The black ash is leached with water to dissolve strontium sulfide values therein and to separate the strontium sulfide from impurities and unreacted compounds. The aqueous strontium sulfide solution is recovered from the leaching process containing from about 7 percent to the saturation concentration of strontium sulfide at the temperature of the solution. A preferred concentration is about 12 to 18 percent by weight SrS. It is desired to make clear that the above process for recovering strontium sulfide is not a part of the present invention and that strontium sulfide produced by any process can be used in the present invention.

In the present invention, a reaction mass containing preformed crystals of strontium carbonate is prepared by adding together an aqueous strontium sulfide solution and sodium carbonate into a reactor. After addition of the two ingredients, strontium carbonate crystals precipitate in the reaction mass.

To this reaction mass containing the preformed crystals of strontium carbonate are added the aqueous strontium sulfide solution and sodium carbonate simultaneously and continuously. The reaction mass must be sufficiently agitated so that the added reactants are always in the same proportions in the reaction mass as they are when added to the reactor. That is, localized concentrations of either feed reactant must be avoided by continuous agitation of the reaction mass. If this essential step is not observed, the crystals formed from the localized concentration of reactants will not grow into large crystals, i.e. over 1.0 micron, in the reaction mass.

The aqueous strontium sulfide solution used as one of the reactants can be at any temperature up to the boiling point of the solution, provided that the temperature selected is sufficient to maintain the strontium values in solution without precipitating strontium hydroxide or other strontium salts. Higher temperatures are preferred because they permit using higher concentrations of strontium sulfide. It is preferred that the strontium sulfide solution utilized be at a temperature of about 85° to about 100°C and that its concentration be from about 12 to 18 percent by weight of SrS. The sodium carbonate reactant can be added dry by means of a screw feeder or other dry feeding device, or if desired an aqueous solution of sodium carbonate may be utilized instead.

The ratio of the reactants which are utilized in the present process depends upon the crystal size which is desired. When stoichiometric amounts of strontium sulfide and sodium carbonate are employed, the crystal size of the precipitated strontium carbonate reaches its maximum size. Accordingly, when strontium carbonate crystals of maximum size are desired, i.e. up to about 7 microns, the reactants are added continuously and simultaneously to the reaction mass in stoichiometric proportions. If crystals of somewhat smaller size are desired, these may be obtained in progressively smaller sizes by setting the mole ratio of the feed reactants progressively away from stoichiometric proportions.

The present invention can be carried out either in batch form or on a continuous basis. In batch form the strontium sulfide and sodium carbonate reactants are added continuously and simultaneously to a given reactor containing a reaction mass of preformed sodium carbonate seed crystals until the reactor is full. Thereafter, the addition of the reactants is terminated, the reaction mass is filtered to recover strontium carbonate from its mother liquor, and the filter cake is dried. In a continuous process the reactants are added simultaneously and continuously to the reaction mass which is agitated sufficiently to avoid localized concentration of either of the feed reactants in the reaction mass. A portion of the slurry is continuously withdrawn from the reactor. The withdrawn portion of slurry may be filtered directly to separate the strontium carbonate crystals from their mother liquor. However, if the withdrawn slurry contains unreacted SrS values or $Na_2CO_3$ values, these may be recovered either before or after filtration by reacting the slurry or mother liquor with added amounts of the necessary reagent in a second reactor to precipitate additional strontium carbonate. The simultaneous addition of the feed reactants and the withdrawal of a portion of the strontium carbonate slurry from the reactor is carried out continuously; the portion of strontium carbonate that always remains in the reactor (for its residence time) serves as the preformed crystals in the reaction mixture.

The form of reactor which is preferred is an agitated tank type reactor in which a slurry of the product is obtained by continuously overflowing the tank. This has the advantage of providing a large reaction mass in which the reactants can readily be dispersed and diluted without localized concentrations of either feed reactant. The tank reactor can be stirred by arms or paddles, or by introducing a gas through the reaction mass which is substantially inert to the reaction mass and product, e.g. $N_2$, air and the like. In many instances, where the reactants have been fed into the reaction tank in substantially non-stoichiometric proportions, e.g. where one of the reagents is added in amounts up to 30 molar percent in excess, the excess unreacted reagent is recovered by passing the overflow slurry into a second reactor. Either aqueous SrS or soda ash as required is then added into the second reactor to precipitate the excess reagent, as strontium carbonate. The slurry from the second reactor containing the precipitated strontium carbonate from the first and second reactors is then filtered to remove the strontium carbonate product from its mother liquor.

The following examples are given to illustrate the invention but are not deemed to be limiting thereof.

EXAMPLE 1

Run A - Process of the Invention

A reaction mass containing preformed strontium carbonate crystals was established in a tank reactor by adding stoichiometric amounts of soda ash and an aqueous strontium sulfide solution. A 16 percent by weight aqueous strontium sulfide solution, having a temperature of 95°C was fed continuously to the tank reactor at 57.8 gallons per minute along with stoichiometric amounts of soda ash. The rate of addition of the strontium sulfide solution and soda ash were metered so that the feed ratio was always in stoichiometric proportions. The reactor was kept vigorously agitated by means of a blade mixer. The reactor had an average hold-up time of approximately 60 minutes and a strontium carbonate slurry continuously overflowed from the tank reactor at a rate of 61 gallons per minute. The resulting slurry had a settling rate of 1.5 ft/hour; this is the rate at which the interface between slurry and supernatant liquid falls in a settling tank.

The slurry was then filtered on a vacuum, rotary filter and the filtration rate was found to be 150 pounds of $SrCO_3$ per hour per square foot of filter area, at a slurry concentration of 17.2 percent by weight of solids, at 70°C, and at a pressure drop across the filter of 16 inches of Hg. The particle size of the strontium carbonate crystals in the filter cake ranged from 2 to 6.5 microns. The filter cake contained 0.2% S as $SO_3^-$.

Run B - Comparative Run

This run was carried out with stoichiometric amounts of a 16 percent by weight strontium sulfide solution at 95°C and sodium carbonate. The SrS solution was charged into a tank reactor; thereafter a stoichiometric amount of soda ash was added to the SrS solution. Agitation of the reaction mass was carried out under the same conditions as Run A. The resulting strontium carbonate slurry was filtered; the slurry and filter cakes had the following properties:

Particle size of $SrCO_3$ — 0.05 to 0.1 microns

Filtration rate — 30 pounds per hour per $ft^2$ at 18.5 percent solids, 89°C, and at 14 inches of Hg pressure drop Filter cake sulfur content — 3.94% S as $SO_3^-$ Settling rate of slurry — too slow a rate to measure

EXAMPLE 2

The process of Example 1, Run A was repeated using a 5 molar percent stoichiometric excess of soda ash to the stirred tank reactor. The resulting slurry and $SrCO_3$ product had the following properties:

Particle size of $SrCO_3$ — 0.5 to 1.0 microns

Filtration rate — 58 pounds per hour per $ft^2$ at 17.2 percent solids, 70°C, and at 16 inches of Hg pressure drop Filter cake sulfur content — 0.2 percent sulfur as $SO_3^-$ Slurry settling rate — 1 ft per hour

EXAMPLE 3

The process of Example 2 was repeated except that the slurry was added to a second reactor and additional amounts of said aqueous strontium sulfide solution were added to precipitate additional strontium carbonate. The results were substantially the same as in Example 2.

Pursuant to the requirements of the patent statutes, the principles of this invention have been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A process for controlling the crystal size of strontium carbonate which comprises continuously and simultaneously adding as feed reactants an aqueous strontium sulfide solution and sodium carbonate to a reaction zone containing a reaction mass containing preformed strontium carbonate crystals, providing sufficient agitation so as to maintain the proportion of said feed reactants in the reaction mass in the same proportions as they are fed to the reaction mass, adding said feed reactants in a ratio of from stoichiometric proportions to within 30 molar percent of stoichiometric proportions whereby largest crystals of strontium carbonate are obtained at stoichiometric proportions and progressively smaller crystals are obtained as the selected ratio of feed reactants departs from stoichiometric proportions.

2. The process of claim 1 wherein the reactants are added in stoichiometric proportions and the strontium carbonate crystals have a size of from about 1 to about 7 microns.

3. Process of claim 1 wherein the strontium sulfide solution has a concentration of about 12 to about 18 percent by weight of strontium sulfide and is at a temperature of 85° to 100°C.

4. Process of claim 1 wherein the resulting slurry of strontium carbonate is added to a second reaction zone and additional amounts of a member selected from the group consisting of strontium sulfide and sodium carbonate are added to precipitate additional strontium carbonate with unreacted feed reactants in said slurry.

* * * * *